(No Model.)

D. H. ALLEN & M. LOREE.
LOCK NUT.

No. 394,948. Patented Dec. 25, 1888.

Attest:
Geo. T. Smallwood.
Clement Smallwood

Inventors:
David H. Allen and
Manfred Loree,
By A. H. Smith & Son
Attys.

UNITED STATES PATENT OFFICE.

DAVID H. ALLEN AND MANFRED LOREE, OF MIAMISBURG, OHIO.

LOCK-NUT.

SPECIFICATION forming part of Letters Patent No. 394,948, dated December 25, 1888.

Application filed May 9, 1888. Serial No. 273,284. (No model.)

*To all whom it may concern:*

Be it known that we, DAVID H. ALLEN and MANFRED LOREE, both of Miamisburg, county of Montgomery, and State of Ohio, have invented a new and useful Improvement in Lock-Nuts, of which the following is a full, clear, and exact description, reference being had to the accompanying drawings, making part of this specification.

Our invention relates to a novel construction of nut, adapting it to lock and hold itself in any position on the bolt to which it may be adjusted; and it consists in providing the nut with one or more yielding spiral tongue portions formed by cutting inclined slits from the outer face inward, and then bending said portions inward and adapting them to yield to the passage of the bolt, whereby they are made to firmly grasp the bolt, and thereby prevent the accidental movement or displacement of the nut, as hereinafter described and claimed.

Figure 1:
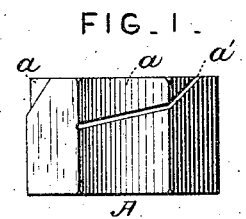
Figure 2:
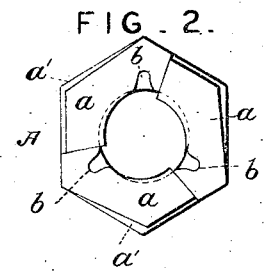
Figure 3:
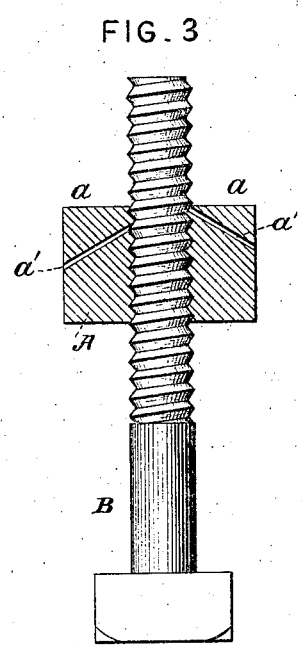

In the accompanying drawings, Figure 1 represents our improved lock-nut in side elevation. Fig. 2 is an outer face view of the same. Fig. 3 represents the nut in section applied to a bolt, the latter being shown in side elevation.

A indicates the nut, and B the bolt, the latter being of any usual or preferred form or construction, according to the use to which it is to be applied.

The nut A may be formed and threaded in any usual manner, the threads extending through it from its inner to its outer face. It is provided with slits or kerfs $a'$, one or more, extending from its outer face inward on lines assuming a spiral relation to the bolt or axial line, and forming tongue portions $a$, preferably made tapering each to a point or edge at its outer end, and from its outer face inward toward the central threaded perforation, as shown. These tongue portions may be formed by sawing or in any other suitable manner, so long as the desired form and relation to the main portion or body of the nut is obtained. In order to give the desired elasticity to the tongues, notches are cut, or the tongues are nicked on their inner faces at or near their bases at $b$, and their outer ends are then bent inward, as shown in Fig. 2, so as to overhang slightly the threaded wall of the body of the nut, and thereby to snugly clasp the bolt and resist the movement of the nut thereon. As the nut is forced inward on the bolt, these tongue portions will of course be crowded outward by the bolt; but they will hug the bolt so tightly as to effectually prevent accidental movement of the nut on the bolt, and so serve to lock and hold the nut at any desired adjustment. The body or main part of the nut, it will be seen, is left solid and operates the same as an ordinary nut; but the spiral or circumferentially-extending tongue or tongues $a$, formed on the outer side thereof, serve, through the grasp and elasticity given them by the construction described, to effectually hold the nut against accidental displacement.

Having now described our invention, we claim as new—

1. A lock-nut having the solid body or inner portion and provided with a slit extending from its outer face inward and laterally and forming a yielding laterally-extending tongue portion, screw-threaded on its inner face and bent inwardly, substantially as and for the purpose described.

2. A nut provided with an inclined slit extending from its outer face inward to form a tapering tongue portion, screw-threaded and bent inwardly to engage the bolt, and having the slit or nick at the base of said tongue, adapting the latter to yield to the pressure of the bolt, substantially as described.

In testimony whereof we have hereunto set our hands this 5th day of May, A. D. 1888.

DAVID H. ALLEN.
MANFRED LOREE.

Witnesses to signature of David H. Allen:
W. P. BELL,
ROBERT M. BELL.

Witnesses to signature of Manfred Loree:
ARTHUR H. WEAVER,
W. H. GAMBLE.